Figure 1:
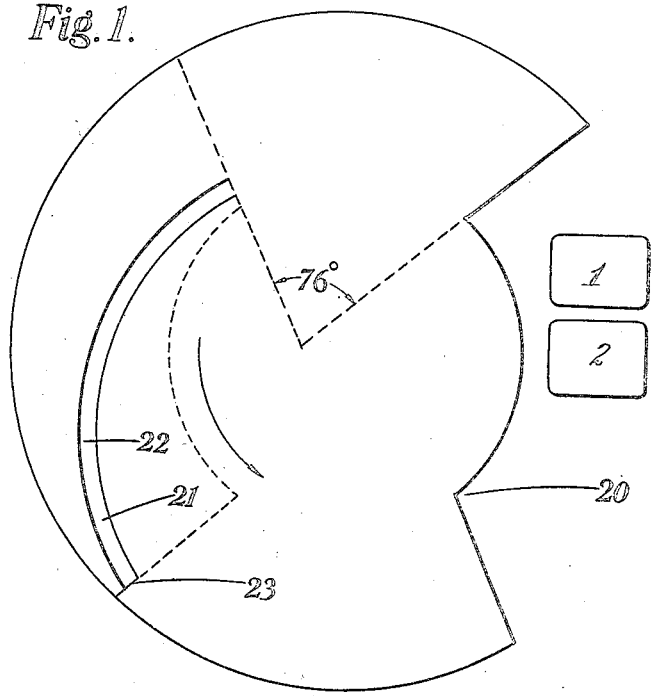

March 16, 1937.  A. G. HILLMAN  2,073,798
PRODUCTION OF CINEMATOGRAPHIC EFFECTS IN COLOR AND MEANS THEREFOR
Filed Dec. 1, 1934   3 Sheets-Sheet 1

INVENTOR
Albert George Hillman
BY
Nathan, Bowman & Helferich
ATTORNEYS

March 16, 1937. A. G. HILLMAN 2,073,798
PRODUCTION OF CINEMATOGRAPHIC EFFECTS IN COLOR AND MEANS THEREFOR
Filed Dec. 1, 1934 3 Sheets-Sheet 2
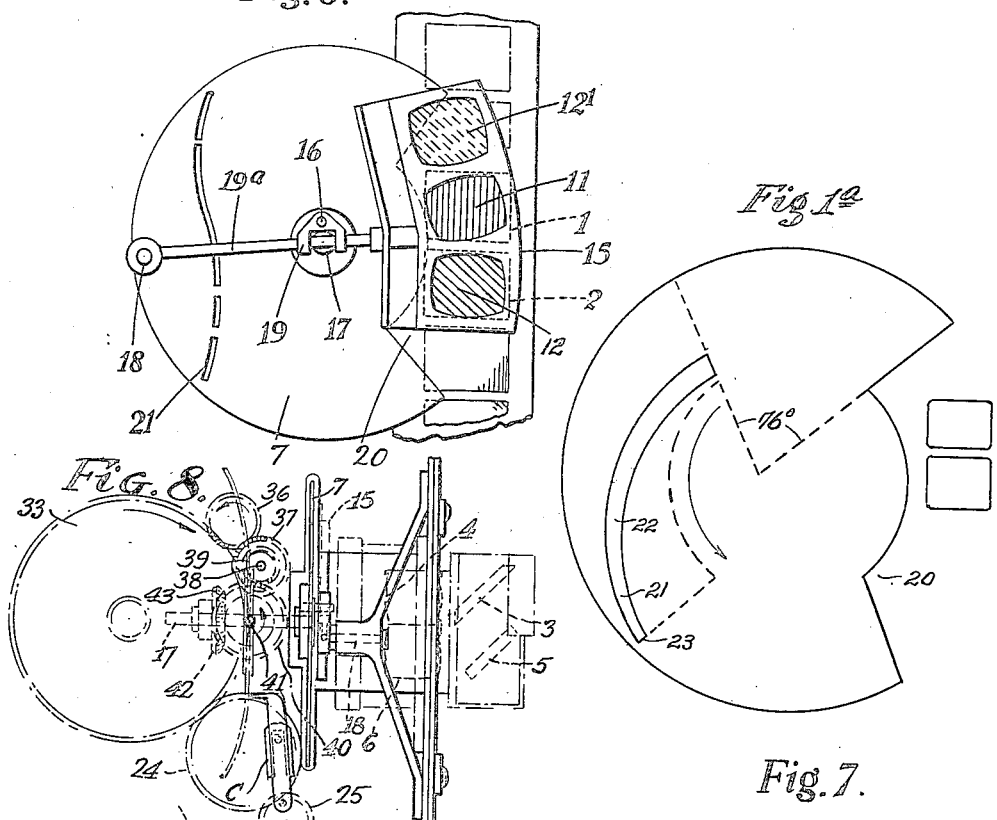
INVENTOR
Albert George Hillman
BY
Nathan, Bowman + Helferich
ATTORNEYS INVENTOR
Albert George Hillman
BY
Nathan, Barman + Helferich
ATTORNEYS Patented Mar. 16, 1937

2,073,798

UNITED STATES PATENT OFFICE 2,073,798

PRODUCTION OF CINEMATOGRAPHIC EFFECTS IN COLOR AND MEANS THEREFOR

Albert George Hillman, London, England

Application December 1, 1934, Serial No. 755,527
In Great Britain December 8, 1933

18 Claims. (Cl. 88—16.4)

This invention relates to a method of producing negative bands containing a single series of color constituent images (hereinafter referred to as negatives) which are suitable for producing corresponding positive constituents which may be projected on the screen simultaneously and so give pictures in substantially natural colors by optical synthesis.

The present invention is particularly applicable for producing negative bands by a method which is generally similar to that described in the specification of my prior patent application Serial No. 707,431 filed January 20, 1934, now Patent 2,047,557, according to which process (when the two color system is used) each negative (except the extreme negatives of the band) is exposed twice, once to the same beam as the preceding negative, and once to the same beam as the succeeding negative, alternate negatives being exposed through red color filters and the intervening negatives through green color filters, the two exposures of each negative being through a filter or filters of the same color and suitable means being provided for dividing the beam at each exposure. Each negative therefore constitutes a composite photograph as regards motion analysis and it is found that when photographing objects in slow or normal motion there is little or no color fringing on projection of the positive film made from such negative film on the screen.

It has been found, however, that when photographing rapidly moving objects or when rapidly changing the aspect of view by quick movement of the camera, and particularly when the movement is near the camera, as often occurs, particularly in studio or indoor work, the difference in the motion phase which occurs between the two exposures of a given negative may become so pronounced that on projecting the positives obtained from the negative band on to the screen, objectionable color fringing results.

The object of the present invention is to diminish this objectionable effect by providing that one of the exposures to which each negative is subjected (either that with the preceding negative or that with the following negative) shall be of greater effect than the other exposure. Such exposures are hereinafter referred to as the main and the partial exposure. The difference in the effect of the exposures may be produced by a variation in the effective aperture, in the time of exposure or by any other suitable method which varies the effect of the beam on the film, e. g., obscuring filters or the like might be used for the partial exposures, though I prefer the methods hereinafter more particularly described. Each of the exposures may be continuous or broken up into a number of separate exposures.

Each picture will thus be formed by what may be termed full and partial exposures and from the negative film made according to my process a monotone positive transparency can be made by any usual or convenient method. In projecting such film each positive (except the extreme positives) is projected twice, once with the preceding and once with the succeeding positive, appropriate color filters being interposed at each projection and the usual single picture pull in the projector can be maintained.

It is found that on projecting on the screen positive films produced by this method, a blurring or smudging is produced which renders the color fringing less apparent.

The invention may be advantageously carried into effect by means of a camera according to my prior patent application Serial No. 672,862 now Patent 1,983,800 and in such application of the invention, the desired effect can be realized by providing one of the shutter apertures, or using in conjunction therewith, an opaque portion or portions which decreases the area of such aperture with respect to the aperture through which the main exposure is made, without however necessarily decreasing its full angular range, as, for example, by providing narrow slots or the like in lieu of the usual aperture or by dividing the latter by means of one or more partial shuttering or obscuring members, which is or are integral or travel with the shutter, and move across the gate so that the exposures made through the slot or divided aperture are substantially less clear than the exposures made through the main aperture.

This may be done, for example, by making the aperture through which the partial exposure is made a continuous or discontinuous arcuate or sinuous or like narrow slot, or by introducing radial or circumferential or other opaque portions into a shutter aperture which is otherwise like the main shutter aperture. But the desired result can be achieved in many and various ways.

In order that the invention may be the more clearly understood, certain constructional forms according thereto are illustrated in the accompanying drawings, in which:—

Figs. 1, 1a, 2, 3 and 4 respectively show face views of four different forms of shutter. Fig. 5 shows diagrammatically in side elevation an optical system and Fig. 6 a front elevation of one form of filter system, which correspond with the systems shown in my prior patent aforesaid.

Fig. 7 shows a piece of film indicating the image arrangement therealong. Fig. 8 is a side elevation of the camera incorporating the aforesaid apparatus.

In each of the first six views, 1, 2 indicate the windows through which two picture areas on the film may be exposed to the same beam A (see Fig. 5) appropriately divided by a perforated mirror 3 so that one part of the beam passes through the mirror and a lens 4 to the picture area exposed in the top window and the other part is reflected by a second mirror 5 through a lens 6 to the picture area exposed in the lower window.

A film shift mechanism is employed to shift the film down one picture area at each cover period, so that the area which has been exposed in the upper window is again exposed in the lower window, the filters being moved during the cover period so that the second exposure of each negative is made through a color filter which is the same as or similar to that through which the first exposure was made.

As will be seen the arrangement of the color filters 11, 12 (12') shown in Fig. 6 fulfils this requirement since, if the exposure through the first window 1 is made through the red filter 11, the simultaneous exposure through the second window will be made through the green filter 12 and, after the shift period is completed, the second exposure in the second window 2, which will be of the red record, will be made through the red filter 11, the first window 1 now being used for photographing a green record, through the green filter 12'.

This filter shift is synchronized with the picture shift timing of the camera, and for compactness it is convenient to employ an oscillating sector 15 carrying three filters arranged one after the other over substantially the same arc, the middle filter 11 being red and the outside filters 12, 12' being green.

As shown the oscillating motion is imparted to the filter sector 15 by a crank pin drive 16 from the spindle 17 of the shutter 7 revolving at half the normal speed, which in an ordinary black and white camera is one revolution for one picture shift. This oscillating sector 15 is pivotally anchored at one end 18, remote from the filters, to the camera framework, and the crank pin drive 16 is preferably transmitted to such oscillating sector 15 through the medium of a sleeve 19 slidably mounted on a rod 19a by which the sector 15 is pivotally mounted. Other appropriate methods of shutter control may however be used.

In each of the examples illustrated, the shutter 7 is provided with two apertures 20 and 21, the aperture 20 being that through which a full or master exposure of each picture area is made and the aperture 21 the one in which the partial exposure of each picture area is effected.

In Fig. 1, is shown an arcuate slot 22, eccentrically struck with reference to the centre of the shutter, through which the partial exposure is made. This slot is so arranged as first to expose the bottom outer corner of the lower window, then to uncover both windows at one side, viz., that remote from the shutter axis, and progressively to pass across both windows, finishing at the opposite side of both windows to that first uncovered. The slot may progressively increase in width from the leading edge 23 as indicated in Fig. 1a.

Figure 2:
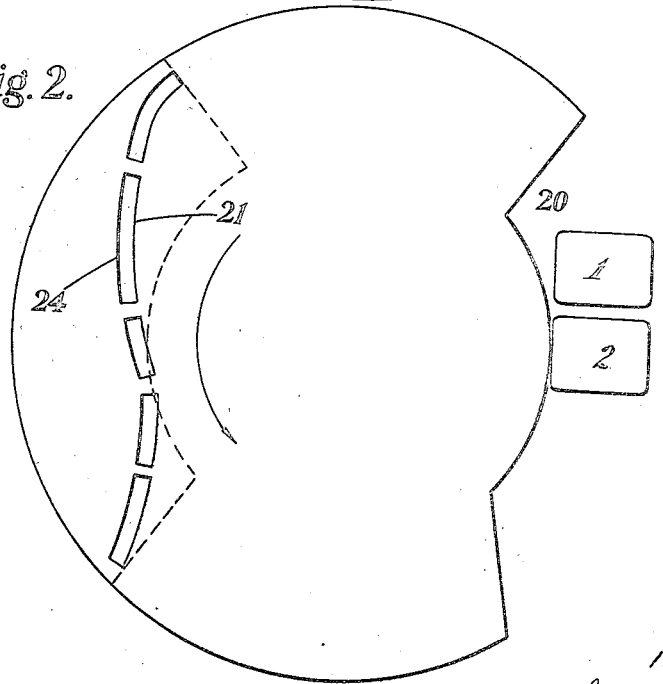

In Fig. 2, which shows the form which is at present preferred, a discontinuous sinuous slot 24 is used which has a double diagonal sweep across the windows first from the lower outer corner and then from the lower inner corner of the bottom window.

Figure 3:
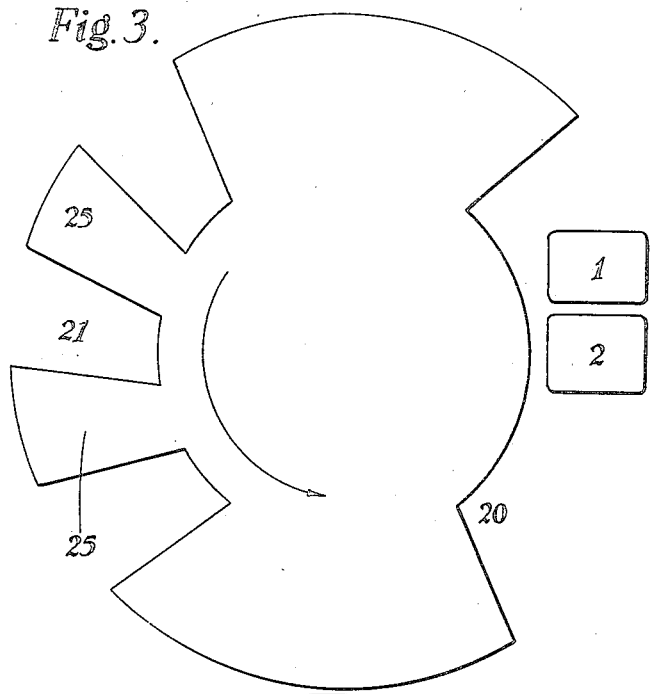
Figure 4:
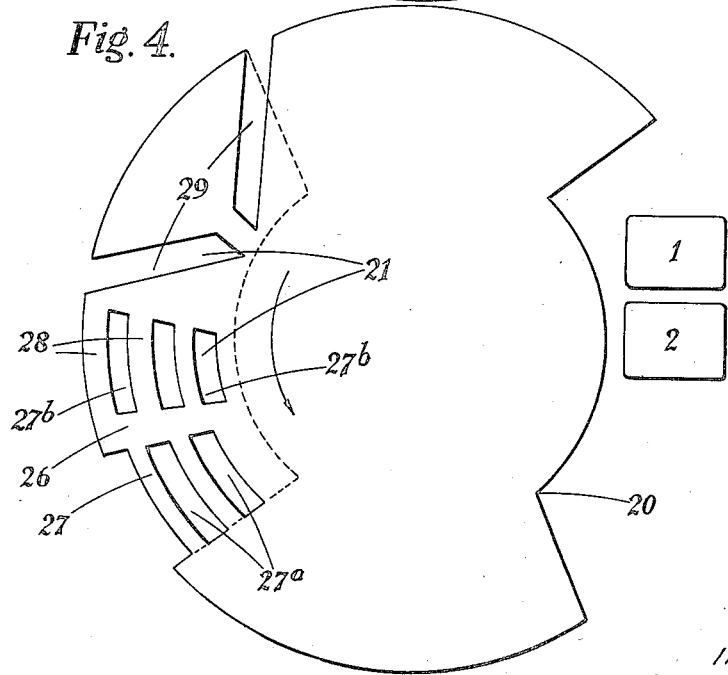

In Fig. 3 an aperture corresponding with the full aperture is broken up by radial shuttering bands or arms 25. Two such arms are shown dividing the aperture into three parts, but a greater or lesser number can be provided. A convenient arrangement is that shown in which the arms and the gaps are of such a size as to be capable of fully, or nearly fully, covering, or exposing, respectively one window. Each picture area is thus given a succession of short exposures.

The normal shutter aperture may also be divided by one or more approximately radial partitions 26 (see Fig. 4) and provided with approximately concentric shuttering bands 27 in such a way that concentric slots 27a are formed on one side of the radial partition, which slots lie at radial distances from the centre of the shutter corresponding to the positions of the bands 28 between the concentric slots 27b on the other side of the partition. Or slots 29 may be formed like a stencilled V (see Fig. 4) with the remote ends of the limbs of the V opening at the periphery of the shutter. Two or more such V slots may be used.

Combinations of other forms of slotting and/or partitioning may be used.

All the above forms are designed to cause the picture areas to be substantially uniformly illuminated.

For the reasons set forth in my prior Patent #2,047,557 it is very advantageous to mount the shutter so that it will cover the individual picture areas successively in such manner that the second (or subsequent) exposure of a negative begins before the first exposure of the following negative. This can be effected by mounting the shutters shown in the drawings to rotate in an anti-clockwise direction, i. e., so that the edges of the shutter apertures are moving at the moment when they effect the exposure, in a direction contrary to that in which the band moves through the camera.

It is also preferred to reduce the cover period as far as possible by employing any suitable accelerated film shift mechanism.

To obtain the best results the aperture through which the partial exposure is made should be so arranged as not to have the effect of increasing the angle subtended by the cover sectors of the shutter.

Fig. 7 shows the manner in which the negatives appear on the band. If the first two picture areas on the band A, B are exposed through the shutter aperture 20, full or "master" images M' M' will be produced thereon from the same beams. Area B will be subsequently exposed, after the film has been shifted down one picture area, with the area C through the obturated shutter aperture 21, so that areas B and C will receive partial exposures S' S' from the same beams. C and D will subsequently receive master exposures M' $M_2$ and D and E partial exposures $S^2$ $S^2$ and so on along the length of the film.

Where there is little or no movement in the scene, the images will be emphasized by the double exposure but where rapid movement has been recorded, then when two positives are projected which have been subjected to the same master exposure, the difference produced by the separate partial exposures has little or no effect on the image produced on the screen, but when two positives are exposed which have been subjected to different master exposures, and are alike only in respect of the partial exposures, the composite image shows a certain amount of confusion. The result is that the moving object becomes somewhat blurred on the screen and fringing of the colors becomes less apparent.

Fig. 8 shows the general construction of the camera suitable for carrying out the invention, and with respect to which, reference may be had if desired, to my prior Patent #1,983,800 for further illustration. The drive for the rotating shutter spindle 17 and of the claw mechanism C for imparting an intermittent movement to the film, may be derived from the usual spring motors, the common toothed wheel 33 being geared up to the motors in the usual way. The wheel 33 drives toothed wheels 24 and 25 which, in turn, operate the claw mechanism C in the conventional manner. Colin N. Bennett's "Guide to Kinematography" (1917), pages 14–24, illustrates the general construction of the timing and feeding mechanisms. For the present purposes, however, it is believed sufficient to say that the drive to the shutter shaft 17 from the wheel 33 is through a tooth wheel 36, and another 37 on the shaft 38 which carries a toothed wheel 39 meshing with another wheel 40 on a shaft 41. The shaft 41 carries a bevel wheel 42 that engages with the bevel wheel 43 on the shutter spindle 17. The timing of the shutter and color filters, and hence also the claw mechanism C, by virtue of its being geared to the common driver 33, is effected as explained in connection with the crank mechanism of Fig. 6.

A camera substantially as above described will produce, as in the case of the camera described in my said Patent #2,047,557 aforesaid an alternating monochrome rendering of color selections on standard film, from which a direct positive can be printed in the usual manner. Standard width film and standard picture pull can be used in the camera as well as in the projector.

The partial shuttering or obscuring member or members may also be used in conjunction with the shutter in the projector.

The negative film and the filters used and the general construction of the camera and projector, and the manner in which the pictures are identified, may be in accordance with those described in my prior patents above referred to, although in general a somewhat wider aperture of the optical system will be used.

Although I have described my invention as applied in a process in which the two negatives are exposed to the same beam appropriately divided, it is also applicable to processes in which a plurality of lenses are employed so that the negatives are exposed to different beams, though for the reasons given in my said prior specifications I consider such processes undesirable on account of the objectionable parallactic effects. Such an exposure to different beams can be effected by merely dispensing with the light dividing and directing system 3, 5 in Fig. 5, and otherwise using the same apparatus.

I claim:—

1. A camera for producing bands of color constituent negatives comprising a beam-dividing device for exposing two or more negatives to the same beam, a filter changing system, a shutter, an accelerated film shift mechanism to move the film by a single picture pull at each shift, said shutter comprising a main exposure shutter aperture and a partial exposure shutter aperture and being mounted to rotate so that the edges of the apertures are moving at the moment when they effect the exposures, in a direction contrary to that in which the band moves through the camera, so that the re-exposure of each negative commences before the exposure of the succeeding negative.

2. A camera for producing a negative band of color constituent images comprising a plurality of picture frame windows, a plurality of objectives situated so as to cast image-carrying beams through the said windows, means for intermittently moving the band to such an extent as to cause the picture frames to be positioned successively in said windows, a shutter having a main exposure aperture and a partial exposure aperture, and means for rotating said shutter so as to bring the main exposure aperture into window-exposing position at each alternate stationary period of the band and to bring the partial exposure aperture into window-exposing position at other stationary positions of the band so as to allow a beam of considerably less effect than the beam permitted by said main exposure aperture to be cast by said objectives.

3. A camera for producing a negative band of color constituent images comprising a pair of picture frame windows, a pair of objectives situated so as to cast image carrying beams through the said windows, color filters for differently coloring said beams, means for intermittently moving the band one picture frame, a shutter having a main exposure aperture and a partial exposure aperture, and means for moving said shutter so as to bring the main exposure aperture into window-exposing position at each alternate stationary period of the band and to bring the partial exposure aperture into window-exposing position at other stationary positions of said band so as to allow a beam of considerably less effect than the beam permitted by said main exposure aperture to be cast by said objectives, and means for changing the position of said color filters during each shift of the film with respect to said windows so that the following exposure of a picture frame in another window is to a beam of the same color as the beam to which such frame was previously exposed.

4. A camera for producing a negative band of color constituent images comprising a pair of picture frame windows, a pair of objectives situated so as to cast image carrying beams through the said windows, means for intermittently moving the band whilst the windows are covered by said shutter by one picture frame, a shutter having a main exposure aperture and a partial exposure aperture, and means for rotating said shutter so as to bring the main exposure aperture into window-exposing position at each alternate stationary period of the band and to bring the partial exposure aperture into window-exposing position at other stationary positions of the band so as to allow a beam of considerably less effect than the beam permitted by said main exposure aperture to be then cast by said objectives, said main and partial exposure apertures having substantially the same angular range, said partial exposure aperture being of considerably less area than said main exposure aperture.

5. A cinematograph camera for producing negative films of color constituent images, comprising a multiple windowed gate, a film track, an optical dividing and directing system and cooperating matched lenses through which the component beams are transmitted to a common focal plane to produce a plurality of images from the same aspect of view on the picture frames exposed in said gate, means for intermittently moving on the film through said track to an extent permitting a re-exposure of the same picture frame in another window of said gate, color filters for differently coloring said component beams, a rotary shutter having a main exposure aperture and a partial exposure aperture, means for rotating said shutter so as to bring the main exposure aperture into window-exposing position at each alternate stationary period of the film and to bring the partial exposure aperture into window-exposing position at other stationary positions of said film so as to allow a beam of considerably less effect than the beam permitted by said main exposure aperture to be cast by said objectives, and means for changing the position of said color filters with respect to said windows so that the following exposure of a picture frame in another window is to a beam of the same color as the beam to which said frame was previously exposed.

6. A cinematograph camera for producing negative bands of color constituent images, comprising a multiple windowed gate, a film track, an optical light dividing and directing system and co-operating matched lenses through which the component beams are transmitted to a common focal plane to produce a plurality of images from the same aspect of view on the picture frames exposed in said gate, means for intermittently moving the film along said track by one picture frame, a sector carrying three color filters arranged one after the other over substantially the same arc, the outside filters being of like color and the intermediate filter of different color, means for oscillating said sector to bring the intermediate filter and an end filter in the path of the component beams at each stationary position of the film, a rotary shutter having a main exposure aperture and a partial exposure aperture, and means to rotate said shutter to bring the main exposure aperture into window-exposing position at each alternate stationary period of the band and to bring the partial exposure aperture into window-exposing position at other stationary positions of said band so as to allow a beam of considerably less effect than the beam permitted by said main exposure aperture to be cast by said objectives, and said sector working in timed relationship with said shutter so as to bring the intermediate filter in front of a different one of said windows at successive stationary positions of the film and simultaneously to bring an outer one of said filters in the position occupied by the intermediate filter at the preceding stationary period of the film, so that each picture frame receives its main and partial exposures through the same or a similar color filter.

7. A camera for producing a negative band of color constituent images, comprising a pair of picture frame windows, a light beam dividing and directing device, and a pair of objectives situated between said device and said windows for casting the component beams formed by said device through said windows, means for intermittently moving the band through a distance equal to one picture frame of the band, a shutter having a main exposure aperture and a partial exposure aperture, said shutter being rotatable to bring the main exposure aperture into window-exposing position at each alternate stationary period of the band and to bring the partial exposure aperture into window-exposing position at other stationary positions of the band so as to allow a beam of considerably less effect than the beam permitted by said main exposure aperture to be cast by said objectives.

8. A camera according to claim 2, comprising a rotary shutter whose axis lies to one side of the picture frame windows, said shutter having an eccentrically disposed slot forming the partial exposure aperture, one portion of said slot being radially co-incident with the side of each picture frame window remote from said axis and another portion adjacent the other end of the slot being radially co-incident with the opposite sides of each picture frame window so that the slot passes progressively over the width of each picture frame window.

9. A camera for producing a negative band of color constituent images comprising a plurality of picture frame windows, a plurality of objectives situated so as to cast image carrying beams through the said windows, a shutter, means for intermittently moving the band whilst the windows are covered by said shutter to such an extent as to cause the picture frames to be positioned successively in said windows, said shutter having a main exposure aperture and a partial exposure aperture, and means for rotating said shutter so as to bring the main exposure aperture into window-exposing position at each alternate stationary period of the band and to bring the partial exposure aperture into window-exposing position at other stationary positions of the band so as to allow a beam of considerably less effect than the beam permitted by said main exposure aperture to be cast by said objectives, said main and partial exposure apertures having substantially the same angular range, said partial exposure aperture being a slot eccentric to the axis of the shutter, said axis being at one side of the picture frame windows, one end of said slot being radially co-incident with the side of each picture frame window remote from said axis and the other end being radially co-incident with the opposite side of each window so that the slot passes progressively over the width of each of said windows, said slot increasing in width from a minimum at its outer end to a maximum at its inner end.

10. A camera according to claim 2 comprising a rotary shutter whose axis lies to one side of the picture frame windows, said shutter having a slot of contrary curvature forming the partial exposure aperture, the ends of said slot being radially coincident with the side of each window remote from said axis and an intermediate portion of said slot being radially co-incident with the opposite side of each of said windows so that said slot progressively passes over said windows in different diagonal directions.

11. A camera as in claim 2 in which the partial exposure aperture is divided by one or more substantially radial obturating members.

12. A camera as in claim 2 in which the partial exposure aperture is divided by one or more substantially radial obturating members, said members and the exposure openings formed therebetween being of a width substantially equal to the depth of each window so as each to be capable of substantially fully covering or exposing respectively one picture frame.

13. A camera as in claim 2, in which a discontinuous slot is used for the partial exposure aperture.

14. A camera as in claim 2, in which the partial exposure aperture is divided by staggered concentric opaque bands.

15. A camera as in claim 2, in which the partial exposure aperture comprises one or more V apertures.

16. A process for the production on a negative band of color constituent images forming one continuous series, which comprises producing image bearing beams, filtering the image bearing beams to provide complementary color images, exposing a plurality of picture frames to the colored images, then shifting the band one picture frame, again producing image bearing beams, filtering such beams, and exposing to a considerably lesser extent than said previous exposure one of the previously exposed picture frames to a like colored image of said last mentioned image bearing beams and a new picture frame to the other colored image.

17. A process for the production on a negative band of color constituent images forming one continuous series, which comprises optically dividing an image-bearing beam into two image-bearing beams from the same view point, filtering the image-bearing beams to provide complementary color images, exposing a pair of picture frames to the colored images, then shifting the film one picture frame, then dividing a second image bearing beam into two image bearing beams from the same view point, filtering the last mentioned image bearing beams to provide complementary colored images, exposing one of the previously exposed picture frames to a like colored image of said last mentioned image bearing beams and a new picture frame to the other colored image, and considerably shortening the time during which said last mentioned picture frames are exposed to said last mentioned image-bearing beams, relatively to the time during which the previously exposed picture frames were exposed to said first mentioned image-bearing beams.

18. A process for the production on a negative band of color constituent images forming one continuous series which comprises optically dividing an image bearing beam into two image bearing beams from the same view point, filtering the image bearing beams to provide complementary color images, exposing a pair of picture frames to the colored images, then shifting the film one picture frame, then dividing a second image bearing beam into two image bearing beams from the same view point, considerably restricting the cross-sectional area of said last-mentioned image-bearing beams, filtering said restricted image bearing beams to provide complementary colored images, and exposing one of the previously exposed picture frames to a like colored image of said restricted image bearing beams and a new picture frame to the other colored image.

ALBERT GEORGE HILLMAN.